US011587037B1

(12) United States Patent
Roth et al.

(10) Patent No.: US 11,587,037 B1
(45) Date of Patent: Feb. 21, 2023

(54) RENTAL DEPOSIT ADVOCATE SYSTEM AND METHOD

(71) Applicant: UIPCO, LLC, San Antonio, TX (US)

(72) Inventors: Valerie Ann Roth, San Antonio, TX (US); Charise Renee Whitaker, San Antonio, TX (US); Oscar Guerra, San Antonio, TX (US); Ashley Raine Philbrick, San Antonio, TX (US); Paula Ann Whittington, Helotes, TX (US); Kelly Q. Baker, San Antonio, TX (US); Will Kerns Maney, Jr., San Antonio, TX (US); Sumita T. Jonak, San Antonio, TX (US); Pragya Kamal, Phoenix, AZ (US); Ryan Thomas Russell, San Antonio, TX (US); Joel S. Hartshorn, Liberty Lake, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 119 days.

(21) Appl. No.: 16/728,788

(22) Filed: Dec. 27, 2019

(51) Int. Cl.
  G06Q 10/10 (2012.01)
  G06Q 40/02 (2023.01)
  G06K 9/62 (2022.01)
  G06Q 50/16 (2012.01)
  G06Q 30/0645 (2023.01)

(52) U.S. Cl.
  CPC ........... G06Q 10/10 (2013.01); G06K 9/6201 (2013.01); G06Q 30/0645 (2013.01); G06Q 40/02 (2013.01); G06Q 50/163 (2013.01)

(58) Field of Classification Search
  None
  See application file for complete search history.

(56) References Cited

U.S. PATENT DOCUMENTS

| | | | |
|---|---|---|---|
| 9,389,314 B1* | 7/2016 | Boyer | G01S 7/523 |
| 9,505,494 B1* | 11/2016 | Marlow | B64C 39/024 |
| 9,818,157 B2* | 11/2017 | McCall | G06Q 20/3276 |
| 2011/0040681 A1* | 2/2011 | Ahroon | G06Q 40/00 705/39 |
| 2012/0086549 A1* | 4/2012 | Barnes, Jr. | G06F 3/04842 340/5.61 |
| 2014/0266682 A1* | 9/2014 | Gettings | G06F 21/64 340/517 |
| 2014/0313334 A1* | 10/2014 | Slotky | G01N 21/9515 348/148 |
| 2015/0039466 A1* | 2/2015 | Skinner | G06Q 30/0609 705/26.35 |

(Continued)

Primary Examiner — William J Jacob
(74) Attorney, Agent, or Firm — Plumsea Law Group, LLC

(57) ABSTRACT

A system and method for automatically documenting a condition of a property and generating a request for return of a security deposit is described. In one embodiment, a method for automatically documenting a condition of a physical space includes determining an initial condition of one or more inspected elements in a physical space. The method also includes obtaining a current condition of the one or more inspected elements in the physical space. The method includes determining changes between the initial condition and the current condition for each of the one or more inspected elements. The method further includes generating a report documenting the changes of the one or more inspected elements in the physical space.

20 Claims, 10 Drawing Sheets

(56) References Cited

U.S. PATENT DOCUMENTS

2015/0186988 A1* 7/2015 Skinner .............. G06Q 30/0645
                                                          705/314
2015/0310720 A1* 10/2015 Gettings .............. G08B 29/188
                                                          340/540
2016/0321503 A1* 11/2016 Zhou ..................... B64C 39/024

* cited by examiner

RENTAL DEPOSIT ADVOCATE SYSTEM AND METHOD

TECHNICAL FIELD

The present disclosure generally relates to a rental deposit advocate system and method, and specifically to a system and method that automatically documents a condition of a rental dwelling and generates a request for return of a security deposit.

BACKGROUND

Inspections are common for apartments and other rental properties. Before a new tenant moves in an inspection is performed (by the tenant, property manager, landlord or another party) to determine if there is any existing damage. During the inspection, the tenant makes note of possible issues or damage on a form that is submitted to the landlord, manager, or owner of the apartment/space. By noting pre-existing damage the tenant can inform the landlord, manager or owner of issues that pre-date the new tenant and therefore are not the financial responsibility of the tenant. In many situations, tenants provide a security deposit prior to moving in. Any costs from damage to the property caused by the tenant may be subtracted from the security deposit, with any remainder being returned to the tenant at the end of the rental term. It is therefore in the financial interest of a would-be tenant to make sure an inspection is performed with any pre-existing damage noted in detail.

When the tenant is preparing to leave the property at the end of the lease, an exit inspection is typically conducted in order to compare the condition of the property with the original condition detailed in the inspection previously conducted at the move-in. Oftentimes, however, the tenant does not have sufficient time to document the property condition for the exit inspection or may not remember which areas of the property need to be documented based on the original inspection. As a result, many tenants fail to request a return of their security deposit.

There is a need in the art for a system and method that addresses the shortcomings discussed above.

SUMMARY

In one aspect, a method for automatically documenting a condition of a physical space is provided. The method includes determining an initial condition of one or more inspected elements in a physical space. The method also includes obtaining a current condition of the one or more inspected elements in the physical space. The method includes determining changes between the initial condition and the current condition for each of the one or more inspected elements. The method further includes generating a report documenting the changes of the one or more inspected elements in the physical space.

In another aspect, a method for automatically documenting a condition of a physical space using a mobile device is provided. The method includes obtaining image information documenting a current condition of a plurality of inspected elements in the physical space using the mobile device. The method also includes comparing the image information documenting the current condition of the plurality inspected elements to image information documenting an initial condition of the plurality of inspected elements. The method further includes automatically generating a report documenting changes in each of the plurality of inspected elements between the initial condition and the current condition. The method includes sending to a landlord of the physical space the report and a request for a return of a security deposit for the physical space.

In another aspect, a system for automatically documenting a condition of a physical space is provided. The system includes at least one mobile device and at least one processor in communication with the at least one mobile device through a communication network. The at least one processor is configured to obtain image information documenting a current condition of a plurality of inspected elements in the physical space from the mobile device. The at least one processor is further configured to compare the image information documenting the current condition of the plurality inspected elements to image information documenting an initial condition of the plurality of inspected elements. The at least one processor is also configured to automatically generate a report documenting changes in each of the plurality of inspected elements between the initial condition and the current condition. The at least one processor is also configured to send to a landlord of the physical space the report and a request for a return of a security deposit for the physical space.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
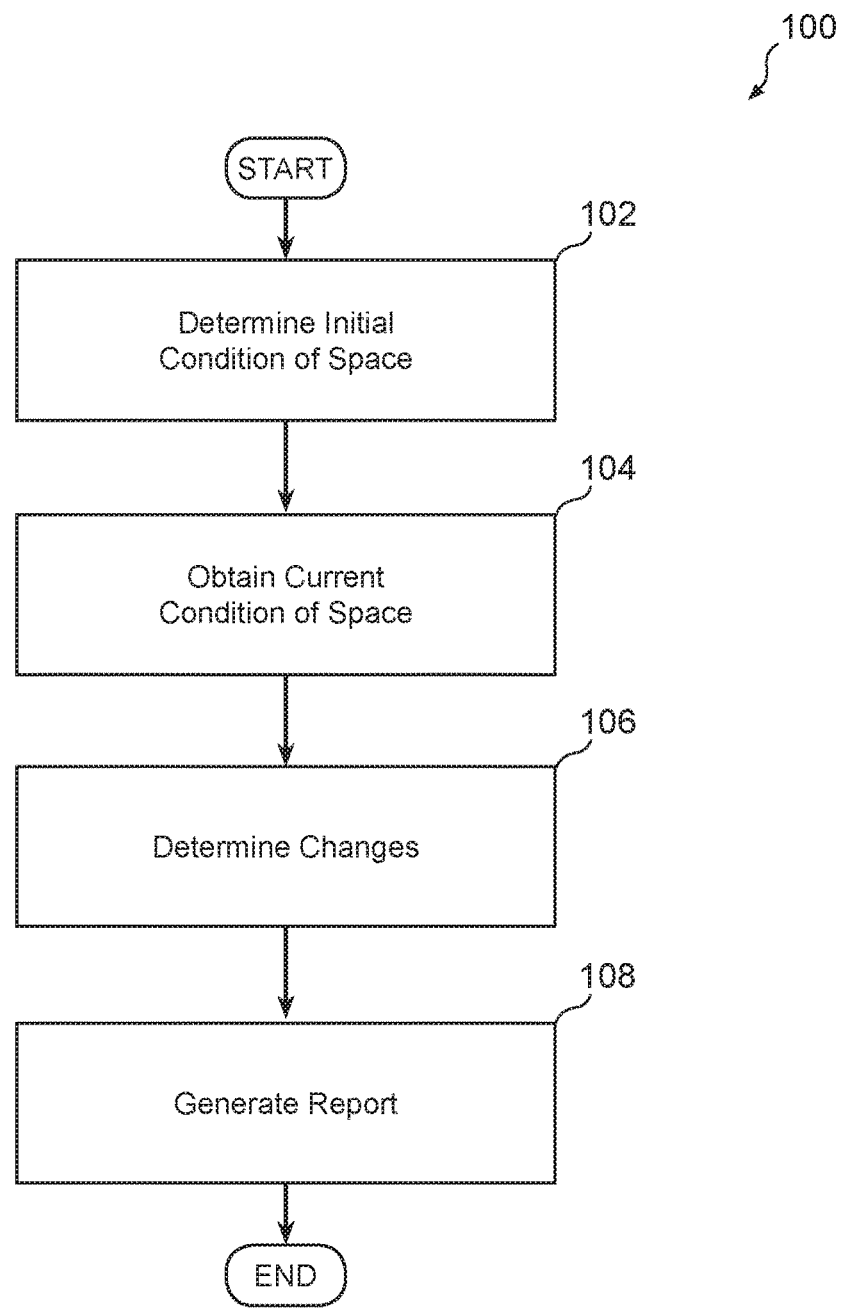
FIG. 1 is a flowchart of an example embodiment of a method for automatically generating a request for return of a security deposit.

The embodiments provide a system and method for automatically documenting a condition of a property and generating a request for return of a security deposit. Specifically, the example embodiments provide a system and method that determines areas in a property that need documentation of their condition and obtains images of those areas, either by guiding the user through various locations or by passively collecting the images while the user is moving through the property over time. By automatically capturing and documenting image information about areas and/or structures in the property, a report of the condition of the property can be generated along with a request to a landlord for a return of the user's security deposit. The system and method of the example embodiments described herein can improve the efficiency of the process for requesting a return of a security deposit.

As used herein, the terms "artificial intelligence" and "machine learning" may be used to describe a variety of techniques in which an algorithm can learn to improve its performance on a task (for example, classifying images into different categories). The embodiments can make use of any known methods and systems in artificial intelligence and/or machine learning.

As used herein, the term "augmented reality" refers to the ability to combine computer generated sensory information (for example, images) with a real-world environment (for example, images or video of a room or other space). The embodiments also make use of methods and systems related to the field of augmented reality. These include methods for identifying and mapping features in a real-world environment, for generating images and/or other sensory data, and for augmenting the real-world environment with the generated images/sensory data. For example, augmented reality systems (AR systems) may include the capability to: sense a physical space using one or more cameras and build models of the space; generate virtual elements; and augment images of the physical space with the virtual elements using a display of some kind. Software tools for building AR systems are known and provided as open source or commercial AR software development kits (SDKs).

An AR system may make use of various known methods, techniques, or algorithms in robotics and/or navigation. For example, some embodiments may utilize the well-known "simultaneous localization and mapping" (SLAM) technique for constructing and updating a map of an unknown environment and determining the location (and pose) of an agent within the map. Some implementations of SLAM can be used to help identify objects, determine distances between objects, determine the dimensions of objects, position objects in a virtual space and/or perform transformations of virtual objects (such as rotation). Various kinds of SLAM techniques are known and adapted to particular kinds of tasks. These include EKF SLAM, FastSLAM, Graph-based SLAM, Topological SLAM and Visual SLAM.

In the example embodiments described herein, a user of the rental deposit advocate system, such as a renter or tenant, has a mobile device or phone that is running a software application that provides the user with an interface that utilizes both augmented reality and machine learning to document the condition of a property, such as an apartment, house or other physical space, and to automatically generate a report of the condition of the property along with a request for a return of the user's security deposit. In some embodiments, the system could be used during a move-out inspection that is often performed by a renter or tenant just prior to or after moving out of a rental property.

FIG. 1 is a flowchart of an example embodiment of a method 100 for automatically generating a request for return of a security deposit for a user. In an example embodiment, method 100 may be used to determine areas and/or structures in a property that need documentation of their condition and obtain images of those areas and/or structures, either by guiding the user through various locations or by passively collecting the images while the user is moving through the property over time. By automatically capturing and documenting information about areas and/or structures in the property, a report of the condition of the property can be generated along with a request to a landlord for a return of the user's security deposit.

As used herein, "areas" refer to a portion of a physical space. Examples of areas include, but are not limited to: divided or undivided partitions or rooms located within a physical space, such as a kitchen, living room, family room, basement, entryway, hallway, bedroom, garage, bathroom, etc. As used herein, the term "structures" refers to some identifiable feature in a physical space. Examples of structures include, but are not limited to: walls, doors, door frames, windows, blinds, curtains, ceilings, floors, carpets, counters, cabinets, tables, light fixtures, electrical sockets, appliances, vents, toilets, bathtubs, sinks, as well as other physical structures. Structures could include both fixed and moveable structures. As used herein, the term "fixed structure" refers to a structure with a fixed position within the physical space, which cannot be displaced without disassembly or destruction. Examples of fixed structures include walls, doors and cabinets. Examples of moveable structures include furniture and appliances. In some property inspections the focus is primarily on fixed structures and some appliances.

In this embodiment, method 100 begins at an operation 102 where an initial condition of a physical space, such as a property or other dwelling, is determined. For example, at operation 102, the initial condition of the space may be determined from a previous inspection, such as a move-in inspection or other documentation of the condition of the space from an earlier time period. In some cases, the initial condition may be obtained from a guided inspection system, such as the system described in U.S. Pat. No. 11,200,421, filed as U.S. Ser. No. 16/288,629 on Feb. 28, 2019 and entitled "Guided Inspection System and Method", the disclosure of which application is hereby incorporated by reference in its entirety. In other cases, the initial condition may be obtained from a checklist or other form filled out when the user moved into the space.

Next, method 100 proceeds to an operation 104. At operation 104, documentation of the current condition of the areas and/or structures in the space is obtained. In an example embodiment, operation 104 includes obtaining images or photos that show a current condition of at least the same areas and/or structures in the space that were documented in the initial inspection. In some embodiments, operation 104 may further include documenting one or more areas and/or structures that were not included in the initial inspection, but which have undergone a significant change in condition since the initial inspection or move-in. For example, damage to areas and/or structures that were not initially documented may have occurred during the time that the user has been renting the space.

Method 100 also includes an operation 106. At operation 106, changes to the condition of areas and/or structures in the space from the initial condition determined at operation 102 are determined. In an example embodiment, operation 106 includes determining whether or not the condition of the areas and/or structures obtained at operation 104 have changed over time from the initial inspection. For example, operation 106 of method 100 may include using artificial intelligence or machine learning techniques to detect and identify any changes to the condition of the areas and/or structures in the space from the initial inspection.

As used herein, the term "machine learning system" refers to any collection of one or more machine learning algorithms. Some machine learning systems may incorporate various different kinds of algorithms, as different tasks may require different types of machine learning algorithms. Generally, a machine learning system will take input data and output one or more kinds of predicted values. The input data could take any form including image data, text data, audio data or various other kinds of data. The output predicted values could be numbers taking on discrete or continuous values. The predicted values could also be discrete classes (for example, a "damaged" class and an "undamaged" class). Numerical outputs could represent a probability that the input belongs to a various classes. Moreover, it may be appreciated that the same machine learning system can be used for training, testing and deployment, in some cases.

Next, method 100 includes an operation 108, where a report detailing the condition of the areas and/or structures in the space is generated. For example, operation 108 can include generating a letter or other document that includes the images or photos of the areas and/or structures in the space as documented during the initial inspection and in their current condition. In some embodiments, operation 108 may also include using artificial intelligence or machine learning techniques to analyze the terms of a lease or rental agreement for the space to determine the conditions that need to be met to have all or a portion of the user's security deposit returned. For example, some leases may exempt "normal wear and tear" or other minimal damage to specific areas and/or structures in the space from the user's liability. The report generated at operation 108 may include reference or citations to the relevant provisions of the lease or rental agreement that govern return of the user's security deposit.

In some embodiments, obtaining documentation of the current condition of the areas and/or structures in the space as part of operation 104 of method 100 above may be implemented in different ways. For example, in one embodiment, the user may be guided through various locations in the space to document the condition of the areas and/or structures according to the same or similar path as the initial inspection. In another embodiment, the system of the present embodiments is configured to passively collect images of the same areas and/or structures from the initial inspection while the user is moving through the space over time.

Figure 2:
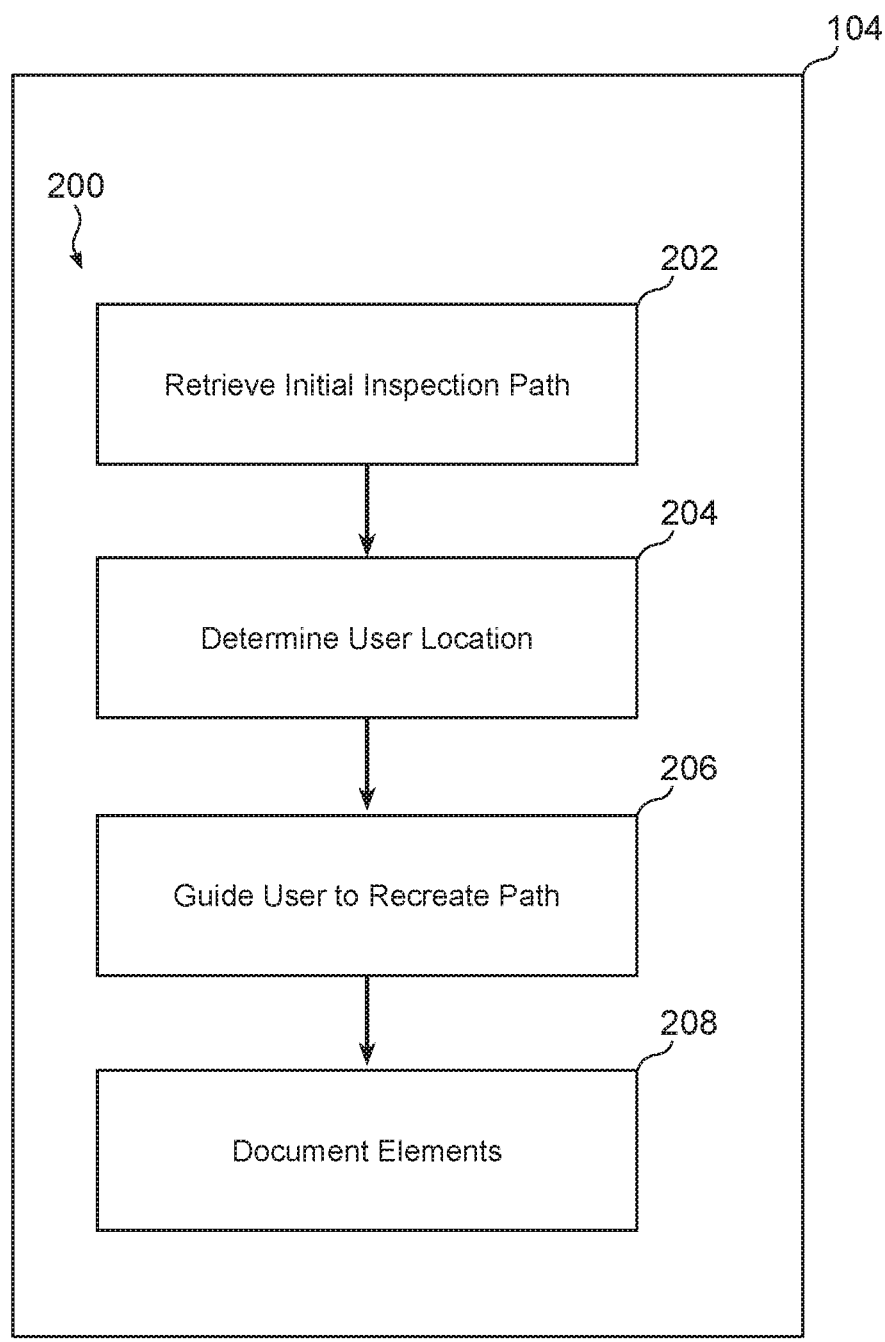
FIG. 2 is a schematic view of an example embodiment of a method for determining areas in a property for documentation.

Referring now to FIG. 2, an example embodiment of a guided documentation process 200 for determining areas in a property for documentation as part of operation 104 of method 100 is shown. In an example embodiment, one or more steps may be implemented using an application on the user's mobile device or cellular phone, as described above. In this embodiment, process 200 for obtaining the current condition of the space (e.g., as part of operation 104) includes a series of steps that guides the user through various locations to document the condition of the areas and/or structures according to the same or similar path as the initial inspection. In this embodiment, process 200 includes a step 202 where an initial inspection path is retrieved. For example, at step 202, the initial inspection path may be obtained from a guided inspection system, such as the system described in U.S. Pat. No. 11,200,421, filed as U.S. Ser. No. 16/288,629, incorporated by reference above. In other embodiments, the initial inspection path may be input from a checklist or other form filled out when the user moved into the space.

Next, process 200 includes a step 204 where the user's location is determined within the space. For example, if the user is in a room of an apartment, step 204 can include determining the user's location within the room, for example, using the user's mobile device or cellular phone that includes a global positioning system (GPS) sensor or other location determining mechanism. In this embodiment, process 200 also includes a step 206 where the user is guided within the space to recreate the initial inspection path (e.g., from step 202). In some cases, the process of guiding the user may be facilitated by augmented reality, including visual displays on the user's mobile device or cellular phone to help the user navigate through the physical space.

In this embodiment, process 200 further includes a step 208 of documenting one or more elements, such as areas and/or structures, in the space that were included in the initial inspection. In an example embodiment, step 208 includes obtaining images or photos of the elements that show any changes or damage to those elements. In some embodiments, the documentation obtained at step 208 may also include video, for example, to document leaking pipes or other issues that may not be sufficiently observed from still images or photos.

Figure 3:
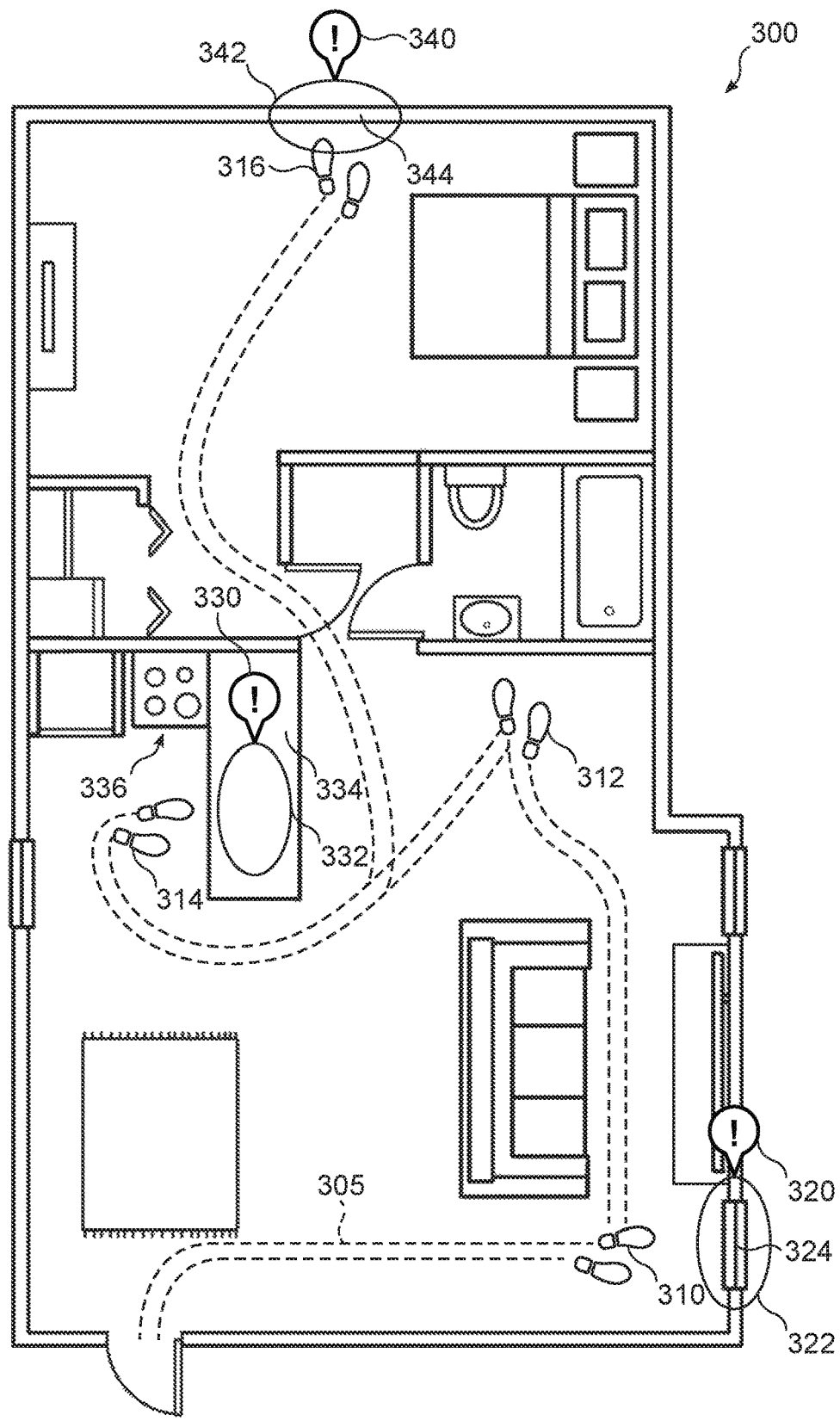
FIG. 3 is a schematic view of an embodiment of a guided documentation process based on a user location.

FIG. 3 illustrates a schematic view of guided documentation process 200 based on a user location within a physical space 300. In some embodiments, physical space 300 could be an apartment, a condominium, a single-family home, a business property or some other type of dwelling or space. Moreover, as used herein, a physical space could refer to only a portion of an apartment, condominium, single-family home, business property or other dwelling or space. For example, in some cases, a user may be renting only a single room within a larger property or space.

In an example embodiment, guided documentation process 200 is used to take a user on a path 305 through various locations within space 300 to document the condition of the areas and/or structures according to the same or similar path as the initial inspection path. In this embodiment, a user may be guided through space 300 using the user's mobile device or phone on which the application is running, as described above. The user's mobile device may then direct the user through space 300 via one or more guidance prompts; which may include displayed text, audible speech, other visual indicators and/or some combination of these. In one embodiment, the mobile device could display a map of the physical space and display a path (or arrow) from the user's current location to another location where the user is to move for documenting the next area or structure. In another embodiment; the mobile device could provide verbal commands, such as "move forward 3 feet", "move closer to the wall in front of you", or "move to the kitchen". Such verbal commands could be spoken or displayed as text on the user's mobile device.

In this embodiment, the user is located at a first user position 310. Upon arriving at first user position 310, the rental deposit advocate system may instruct the user to capture images or photos about a particular structure located at that position. For example, as shown in FIG. 3, at first user position 310, the user's mobile device generates a first alert 320 that informs the user of a first inspection area 322 where at least one element requires documentation. In this embodiment, first alert 320 on the user's mobile device informs the user to document a first inspection element 324 (e.g., a window) at first inspection area 322. For example, the system could prompt a user to "focus camera on the window and take a picture."

Next, path 305 may take the user to a second user position 312. In this embodiment, second user position 312 may be associated with an area or structure within space 300 that does not need documentation. For example, second user position 312 may be a structure within space 300 that was repaired or remodeled during the rental term so that a comparison with the initial inspection would not be possible or the area or structure at second user position 312 may be exempt from the user's liability according to the terms of the lease or rental agreement.

In this embodiment, path 305 through space 300 further includes a third user position 314. As shown in FIG. 3, at third user position 314, the user's mobile device generates a second alert 330 that informs the user of a second inspection area 332, for example, a kitchen, where at least one element requires documentation. In this embodiment, second alert 330 on the user's mobile device informs the user to document a second inspection element 334 (e.g., a kitchen counter), as well as a third inspection element 336 (e.g., a stove), both located at second inspection area 332.

Next, path 305 takes the user from third user position 314 to a fourth user position 316. Upon arriving at fourth user position 316, the user's mobile device generates a third alert 340 that informs the user of a third inspection area 342 where at least one element requires documentation. In this embodiment, third alert 340 on the user's mobile device informs the user to document a fourth inspection element 344 (e.g., a bedroom wall) at third inspection area 342.

Figure 4:
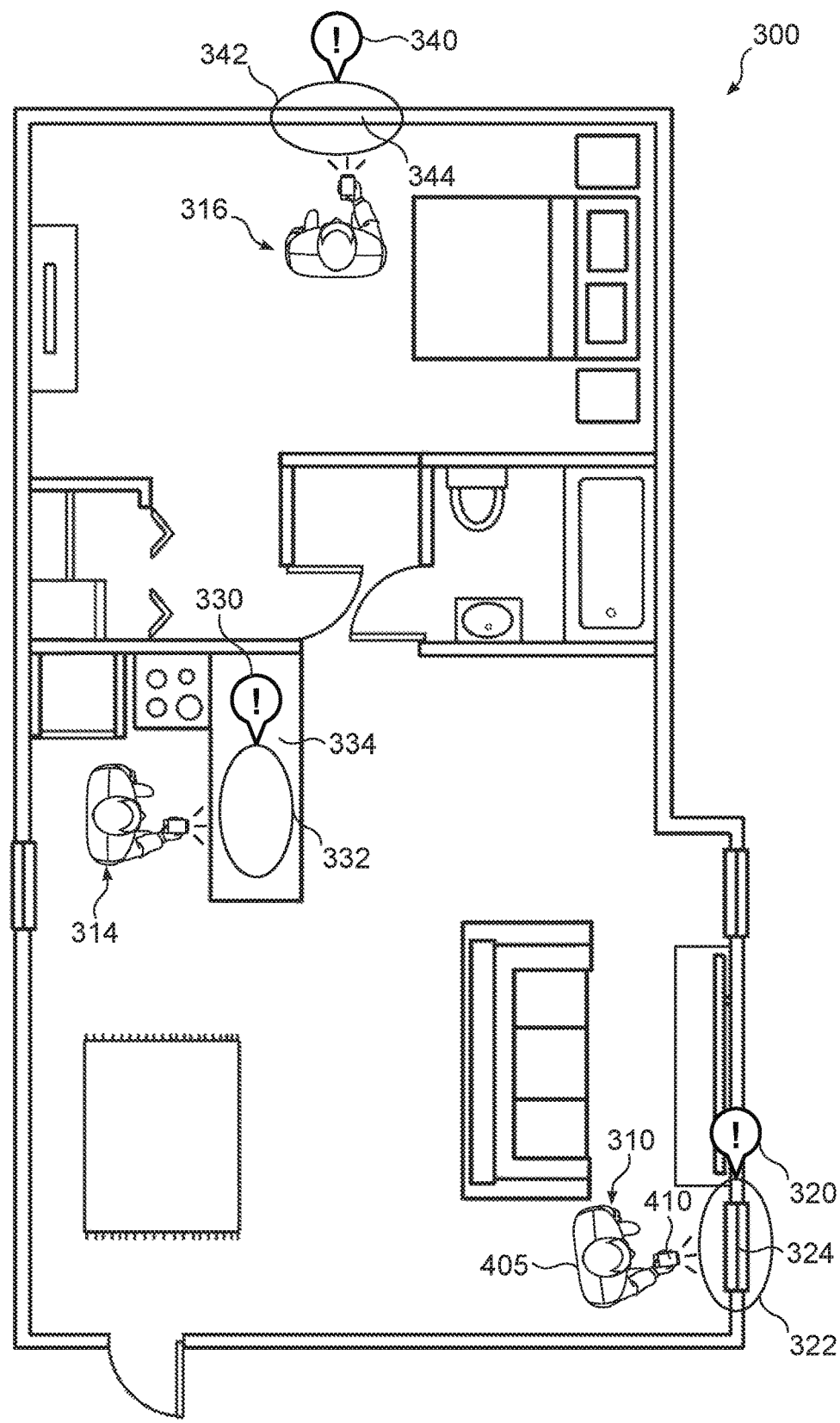
FIG. 4 is a schematic view of an embodiment of the guided documentation process used to document areas in a property.

Referring now to FIG. 4, guided documentation process 200 is shown being used by a user 405 to document areas in physical space 300. In some cases, the process of guiding user 405 may be facilitated by augmented reality, including visual displays to help user 405 navigate through physical space 300. In this embodiment, user 405 has a mobile device 410 on which the application for implementing the rental deposit advocate system according to the techniques described herein is running.

Mobile device 410 may comprise any device that can be brought to the location where an inspection is to occur and may generally include a processor, a data storage component and a display, such as a phone, tablet, or computer. In an example embodiment, mobile device 410 further includes at least one data-gathering sensor, such as a camera, that is configured to document the areas and/or structures within space 300. Mobile device 410 may also include components to facilitate communication with external systems (for example, hardware and software components to enable communication over a network). In some cases, mobile device 410 includes one or more physical buttons, touchscreen controls, speakers, and/or a microphone for receiving and generating audible sounds. In the exemplary embodiment of FIG. 4, mobile device 410 is a smartphone.

As shown in FIG. 4, at first user position 310, in response to first alert 320, user 405 documents first inspection element 324 (e.g., a window) at first inspection area 322 using a camera of mobile device 410 to take a photo or image of first inspection element 324. Similarly, at third user position 314, in response to second alert 330, user 405 documents second inspection element 334 (e.g., a kitchen counter) and third inspection element 336 (e.g., a stove) at second inspection area 332 using the camera of mobile device 410. Additionally, at fourth user position 316, in response to third alert 340, user 405 documents fourth inspection element 344 (e.g., a bedroom wall) at third inspection area 342 using the camera of mobile device 410.

In some embodiments, mobile device 410 may analyze the documentation for the inspection element to determine whether the photo or image is of a sufficient resolution or clarity to accurate show or document the condition of the inspection element at that inspection area. If additional photos or images from different angles or orientations are needed, mobile device 410 can inform user 405 to continue taking additional photos until sufficient documentation is obtained for that inspection area.

In the previous embodiment, obtaining documentation of the current condition of the areas and/or structures in the space as part of operation 104 of method 100 above was implemented as part of guided documentation process 200. As described above, in other embodiments, obtaining documentation of the current condition of the areas and/or structures in the space as part of operation 104 of method 100 may also be implemented by passively collecting the documentation (e.g., images or photos) while the user is moving through the property over time.

Figure 5:
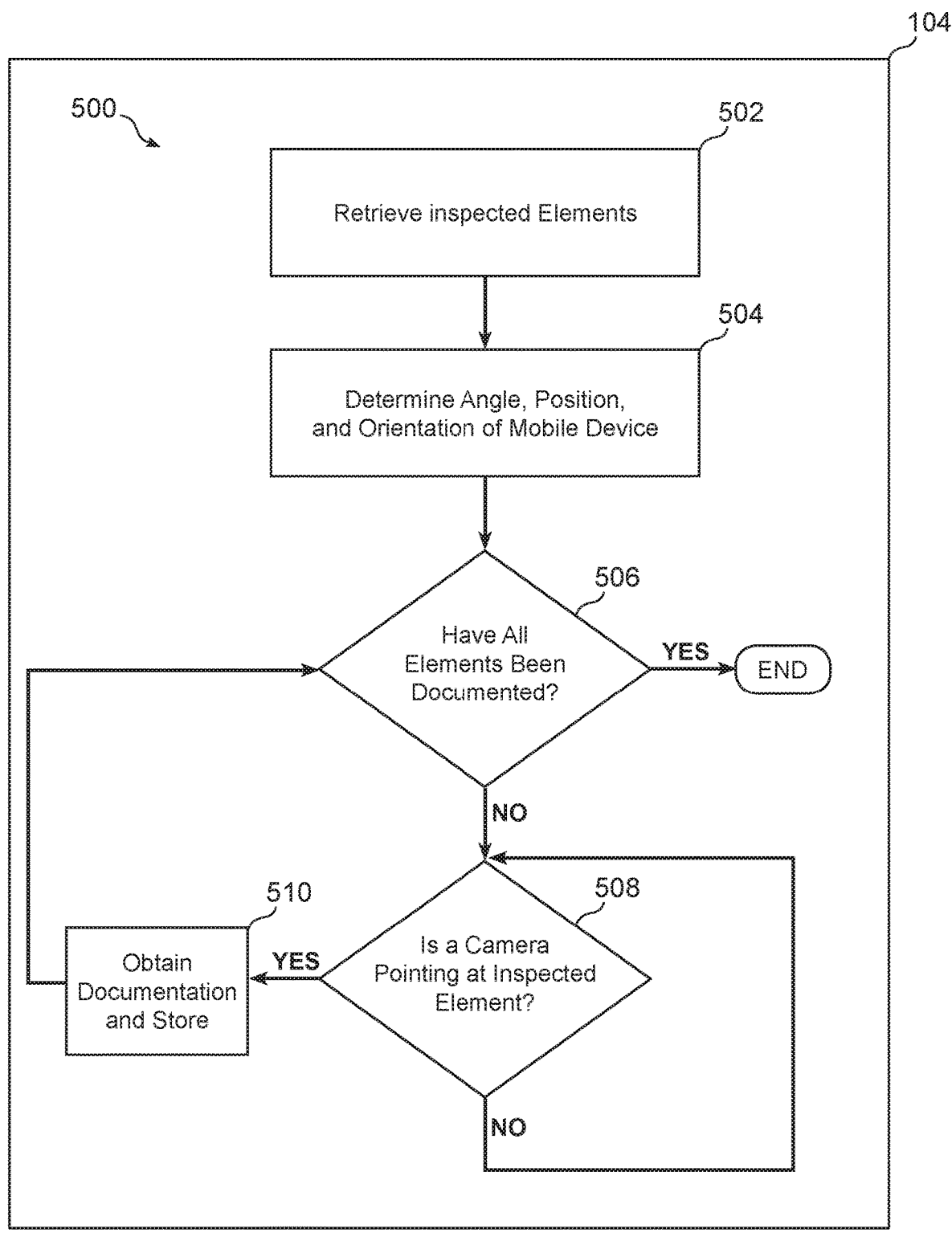
FIG. 5 is a schematic view of an alternate embodiment of a method for determining areas in a property for documentation.

Referring now to FIG. 5, an alternate embodiment of a process 500 for determining areas in a property for documentation as part of operation 104 of method 100 is shown. In an example embodiment, one or more steps may be implemented using an application on the user's mobile device or cellular phone, as described above. In this embodiment, process 500 for obtaining the current condition of the space (e.g.; as part of operation 104) is a passive documentation process. That is, in contrast to guided documentation process 200, described above, passive documentation process 500 may be implemented in the background to obtain the necessary documentation while the user is performing other actions.

As shown in FIG. 5, passive documentation process 500 includes a step 502 where one or more inspected elements, such as areas and/or structures, from the initial inspection is retrieved. For example, at step 502, the initial inspection elements may be obtained from a guided inspection system, such as the system described in U.S. Pat. No. 11,200,421, filed as U.S. Ser. No. 16/288,629, incorporated by reference above. In other embodiments, the initial inspection elements may be input from a checklist or other form filled out when the user moved into the space.

Next, process 500 includes a step 504 where one or more of an angle, position, or orientation of the user's mobile device is determined. At step 504, the information associated with the user's mobile device is determined while the user is performing other tasks on the mobile device (i.e.; step 504 occurs in the background). Process 500 may proceed to a step 506 where whether or not all of the inspected elements (e.g., from step 502 above) have been documented is determined. Upon determining at step 506 that all of the inspected elements have been documented (i.e., the decision at step 506 is "YES"), then process 500 ends. This information associated with the user's mobile device determined at step 504 may be used to determine where in the physical space the user is located and at which elements (e.g., areas and/or structures) the camera of the mobile device is pointing towards or facing.

Upon determining at step 506 that all of the inspected elements have been documented (i.e., the decision at step 506 is "NO"), then process 500 proceeds to a step 508. At step 508, whether a camera associated with the user's mobile device is pointing at or facing towards an inspected element (i.e., one of the elements from step 502 above) is determined. Upon determining at step 508 that a camera is not pointing at or facing towards an inspected element (i.e., the decision at step 508 is "NO"), then process 500 returns back to the beginning of step 508 until such time as the camera is pointing at or facing towards an inspected element. In some embodiments, step 508 may include a delay factor, such as a predetermined time period, or other mechanism to limit how often step 508 is implemented to check for an inspected element in the camera field of view. In other embodiments, further iterations of step 508 may occur when process 500 determines that at least one of the angle, position, or orientation of the user's mobile device has changed.

Upon determining at step 508 that a camera is pointing at or facing towards an inspected element (i.e., the decision at step 508 is "YES"), then process 500 includes a step 510 where documentation of the inspected element is obtained and stored. For example, at step 510 the documentation may be obtained by automatically causing the user's mobile device to take a photo or picture of the inspected element that the camera is facing or pointing towards.

Additionally, at step 510 the documentation of the inspected element is stored for later retrieval as part of method 100. In some embodiments, passive documentation process 500 may be implemented over a predetermined time period prior to the end of the user's lease or rental agreement. For example, in one embodiment, the predetermined time period may be two months prior to the lease or rental agreement expiration. In other embodiments, the predetermined time period maybe longer or shorter to provide a sufficient amount of time to passively collect the needed documentation of the inspected elements in the space. Accordingly, at step 510, the documentation of each inspected element is stored, for example, in a database or other memory associated with the rental deposit advocate system.

Upon completion of step 510, process 500 returns to step 506 to determine whether or not any inspected elements are remaining. In this manner, process 500 may be repeatedly executed in the background to passively obtain all of the documentation of the inspected elements in the user's space that are needed to generate the report of the condition of the property as part of operation 108 of method 100, described above.

Figure 6:
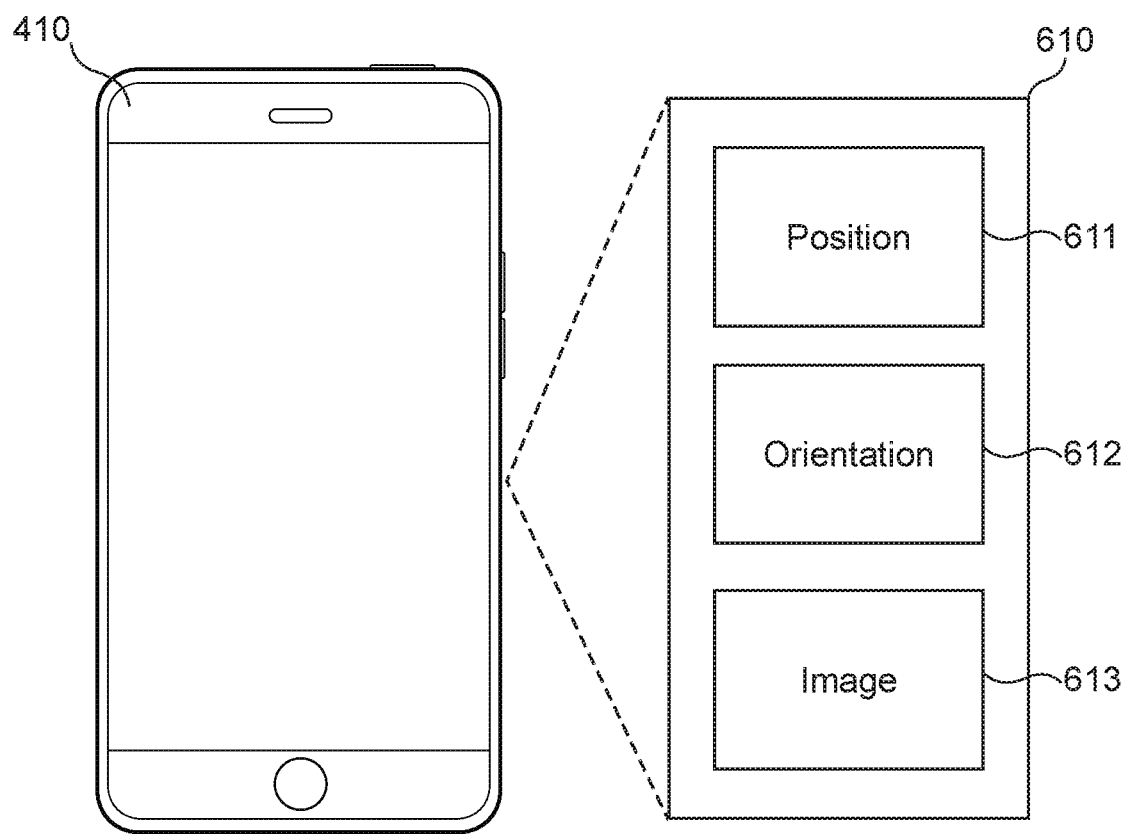
FIG. 6 is a schematic view of an example embodiment of a mobile device for documenting areas in a property.

Referring now to FIG. 6, an example embodiment of a mobile device for documenting areas in a property is shown. In some embodiments, the mobile device may be any device on which the application for implementing method 100 can be executed. In this embodiment, the mobile device is mobile device 410, described above. Mobile device 410 may include hardware components 610 for capturing sensory information, as well as storing and/or transmitting captured information. As used herein the term "sensory information" can include visual information, audible information, tactile information and/or information related to the motion of the mobile device (for example, acceleration information). In this embodiment, components 610 include at least a position sensor 611 that is configured to determine at least a location or position of mobile device 410 within a space. In some embodiments, position sensor 611 may include a GPS receiver for receiving GPS information that can be used to determine the location and/or position of the mobile device. In this embodiment, mobile device 410 also includes an orientation sensor 612 that is configured to determine an orientation of mobile device 410 and/or one or more of its cameras within a physical space. In some embodiments, orientation sensor 612 may include an accelerometer and/or gyroscope for detecting linear accelerations and/or angular rotational velocity. In some cases, accelerometer and/or gyroscope data can be used by the rental deposit advocate system to locate and orient the mobile device within the physical space (e.g., space 300, described above).

In an exemplary embodiment, components 610 of mobile device 410 also include at least one image sensor 613. In some embodiments, image sensor 612 may be a camera for capturing images in the form of photos or video. For example, some mobile devices are configured with multiple cameras, including front-facing and/or rear-facing cameras on opposite sides of the mobile device. Accordingly, image sensor 613 may include multiple cameras, including front-facing and/or rear-facing cameras.

Mobile device 410 may include additional sensors including, but not limited to: a proximity sensor to detect proximity to one or more objects in a physical space, an ambient light sensor for detecting ambient light conditions in a physical space, and a compass for detecting directional information.

Mobile device 410 may run one or more software applications as described herein. These applications could be native to the mobile device's operating system or web-applications that run on a browser. Moreover, an application may be configured with a graphical user interface (GUI) that facilitates visual and/or tactile interaction between a user and elements of the rental deposit advocate system.

Figure 7:
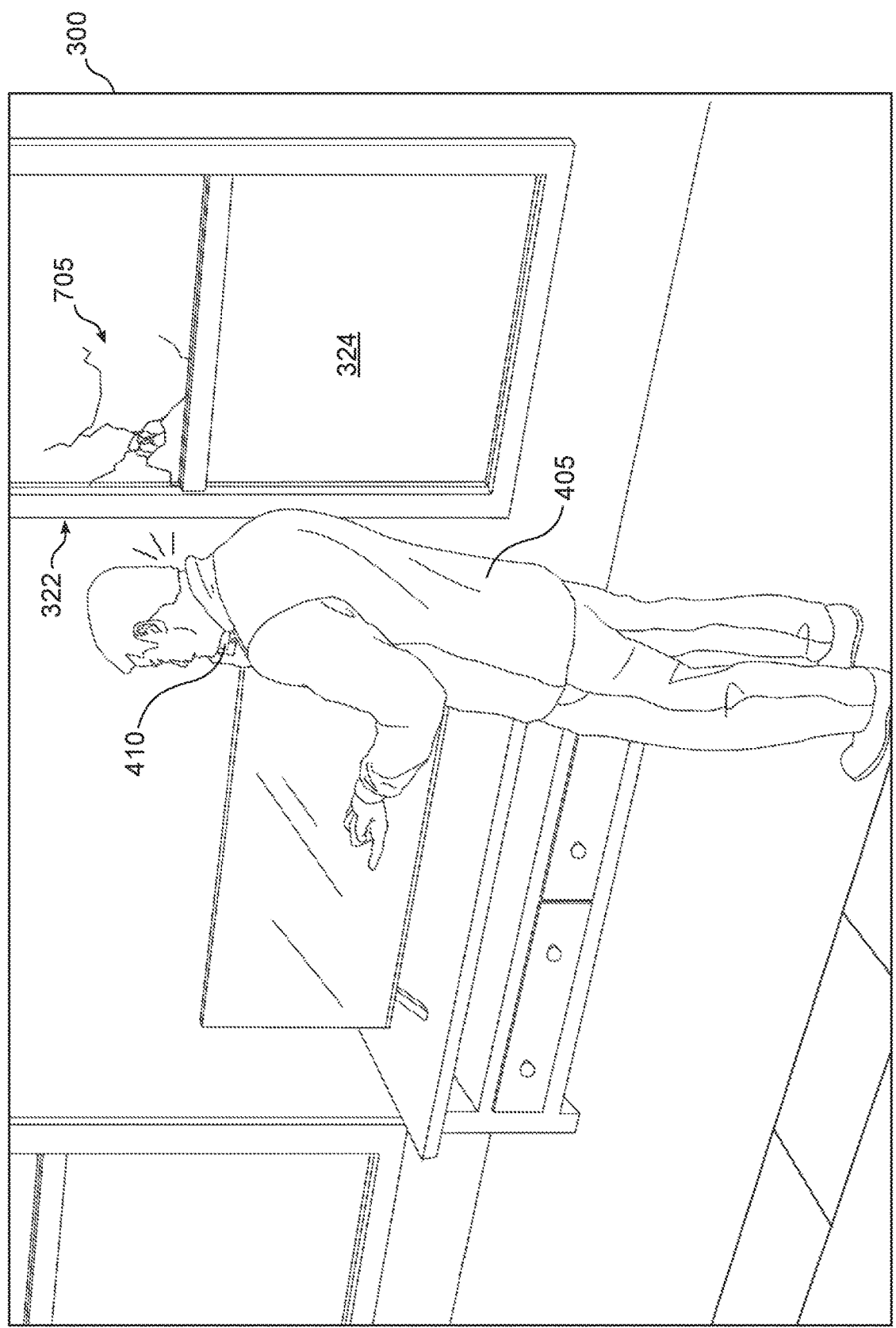
FIG. 7 is a schematic view of an embodiment of a passive documentation process used to document areas in a property.
Figure 8:
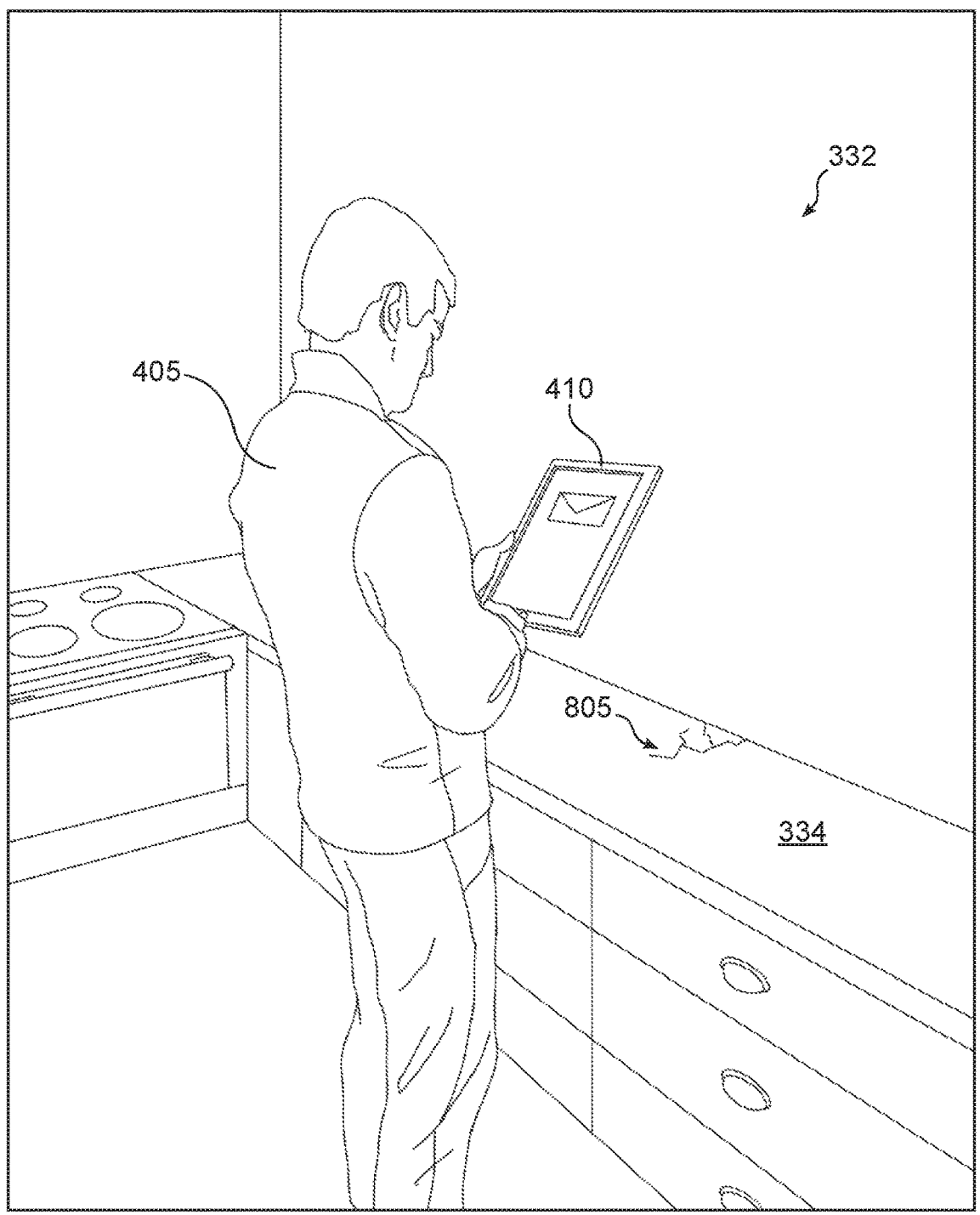
FIG. 8 is another schematic view of an embodiment of a passive documentation process used to document areas in a property.
Figure 9:
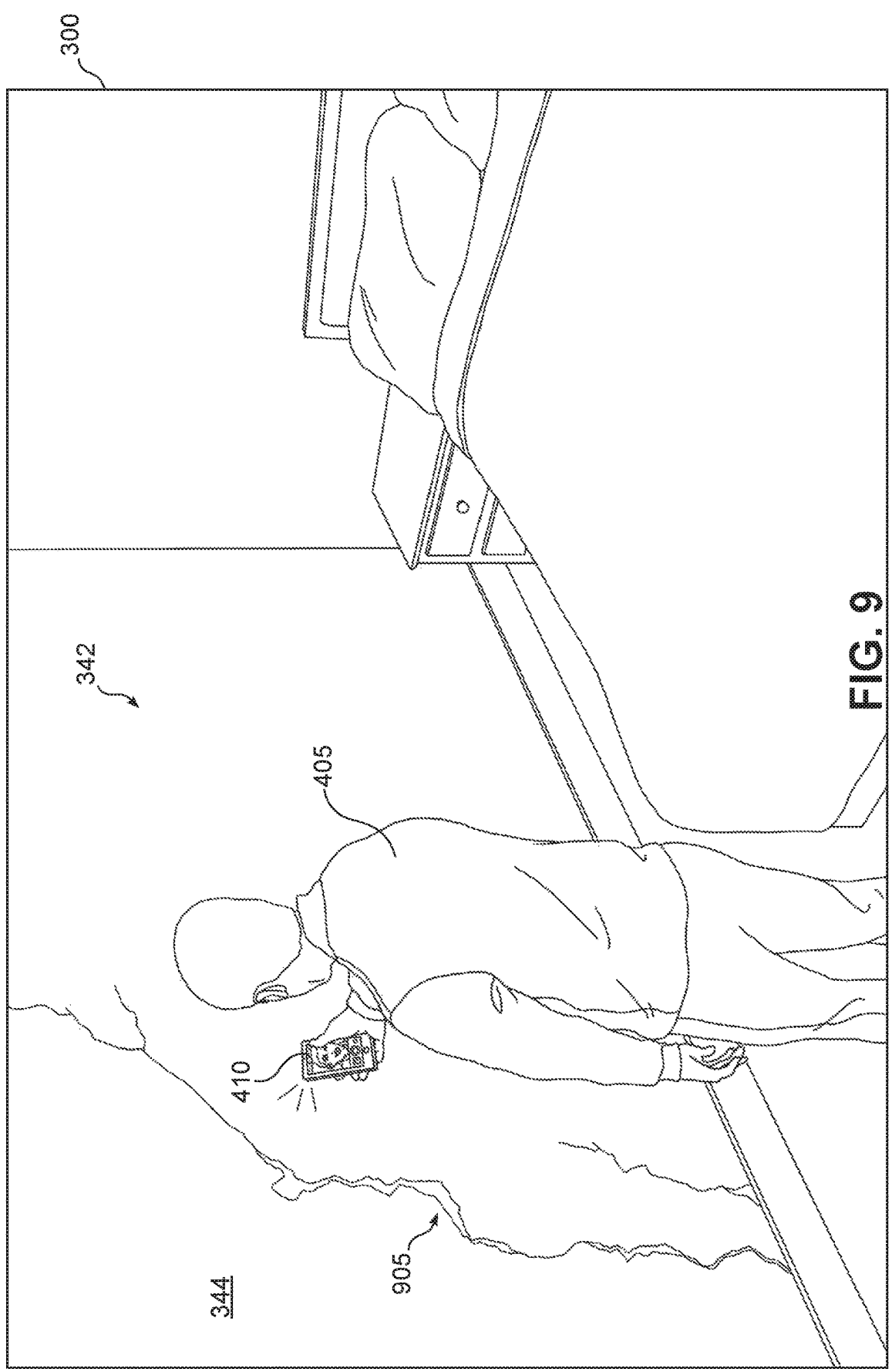
FIG. 9 is another schematic view of an embodiment of a passive documentation process used to document areas in a property.

Referring now to FIGS. 7 through 9, examples of mobile device 410 obtaining images of inspected elements according to passive documentation process 500, described above, is shown. As shown in FIGS. 7-9, the rental deposit advocate system described herein is configured to automatically take pictures (or video) of one or more inspected elements (e.g., areas and/or structures) in the physical space (e.g., space 300, described above) as they are automatically identified by an image detection/recognition algorithm executing in the background of a user's mobile device.

Referring first to FIG. 7, user 405 is shown with mobile device 410 (as described above in reference to FIG. 4) moving through physical space 300. In this embodiment, mobile device 410 is running an application that is configured to execute passive documentation process 500, as described above, to obtain documentation of one or more inspected elements as user 405 moves through space 300. As shown in FIG. 7, user 405 is talking on mobile device 410 as he moves past first inspection element 324 (e.g., a window) at first inspection area 322. In accordance with passive documentation process 500, mobile device 410 is configured to automatically recognize first inspection element 324 and obtain documentation of its condition. For example, mobile device 410 may take a photo of window damage 705 using a front-facing camera of mobile device 410 that is pointing towards first inspection element 324 while user 405 holds mobile device 410 near his head. With this arrangement, the documentation of first inspection element 324 showing window damage 705 may be passively obtained by mobile device 410 as user 405 is moving through space 300.

Referring next to FIG. 8, user 405 is again shown with mobile device 410 running the application executing passive documentation process 500, as described above, moving through another portion of physical space 300. In this embodiment, user 405 is reading email on mobile device 410 near second inspection element 334 (e.g., kitchen counter) at second inspection area 332. In accordance with passive documentation process 500, mobile device 410 is configured to automatically recognize second inspection element 334 and obtain documentation of its condition. For example, mobile device 410 may take a photo of counter damage 805 using a rear-facing camera of mobile device 410 that is pointing towards second inspection element 334 while user 405 holds mobile device 410 to read email. With this arrangement, the documentation of second inspection element 334 showing counter damage 805 may be passively obtained by mobile device 410 as user 405 is moving through space 300.

Referring next to FIG. 9, user 405 is once again shown with mobile device 410 running the application executing passive documentation process 500, as described above, moving through another portion of physical space 300. In this embodiment, user 405 is taking a photo on mobile device 410 using a front-facing camera near fourth inspection element 344 (e.g., a bedroom wall) at third inspection area 342.

In accordance with passive documentation process 500, mobile device 410 is configured to automatically recognize fourth inspection element 344 and obtain documentation of its condition. For example, mobile device 410 may take a photo of wall damage 905 using a rear-facing camera of mobile device 410 that is pointing towards fourth inspection element 344 while user 405 holds mobile device 410 towards his own face to take a picture using the front-facing camera, With this arrangement, the documentation of fourth inspection element 344 showing wall damage 905 may be passively obtained by mobile device 410 as user 405 is moving through space 300.

It should be understood that using passive documentation process 500, as described herein, to obtain the documentation of the inspected elements shown in FIGS. 7, 8, and 9 above (e.g., first inspection element 324, second inspection element 334, and fourth inspection element 344), may occur at various times and occasions over a predetermined time period, as described above. In other words, passive documentation process 500 may be implemented in the background without requiring explicit action by the user.

Figure 10:
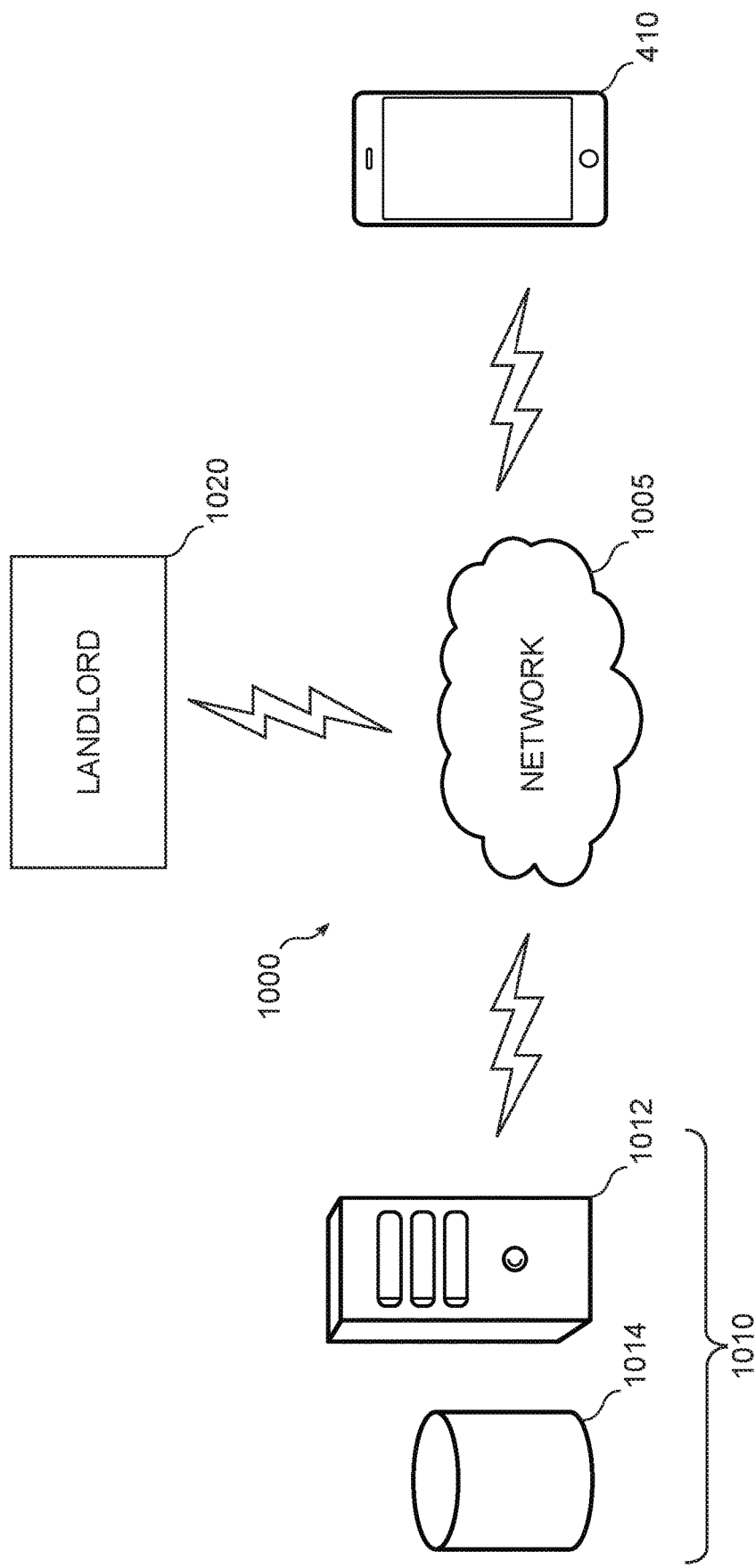
FIG. 10 is a schematic view of an example embodiment of a system for automatically generating a request for return of a security deposit.

FIG. 10 is a schematic view of an embodiment of a rental deposit advocate system 1000, also referred to simply as system 1000. System 1000 may include various sub-systems and other components that facilitate automatically capturing and documenting image information about areas and/or structures in a property and generating a report of the condition of the property along with a request to a landlord for a return of the user's security deposit. In this embodiment, one or more components of system 1000 may be configured to communicate over a communication network 1005. Communication network 1005 may be any kind of network suitable for communication between separate computing systems.

For example, communication network 1005 may include any one or combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multi-protocol label switching (MPLS), User Datagram Protocol (UDP), hypertext transport protocol (HTTP) and file transfer protocol (FTP) as well as other protocols.

In an example embodiment, system 1000 also includes a computing system 1010 that is configured to implement one or more of the methods, processes, operations, and/or steps described herein. In this embodiment, computing system 1010 includes at least one processor, for example, one or more processors associated with a server 1012. Computing system 1010 may also include a database 1014 that is configured to store information and documentation associated with the techniques described herein, including, but not limited to documentation associated with the one or more inspected elements in a physical space (e.g., space 300).

In some embodiments, a mobile device and a computing system could operate in a client-server relationship. For example, server 1012 of computing system 1010 may communicate with mobile device 410 via network 1005, as well as other remote devices. In some cases, multiple remote devices running individual instances of a rental deposit advocate system application could operate as clients in communication with computing system 1010 over network 1005.

As shown in FIG. 10, computing system 1010 may also communicate with a landlord 1020 over network 1005. In an example embodiment, computing system 1010 may communicate with landlord 1020 via network 1005 to provide a report of the condition of the property along with a request to landlord 1020 for a return of the user's security deposit. For example, as described above with reference to operation 108 of method 100.

Techniques from artificial intelligence and machine learning could be used for image detection and/or recognition as well as for other purposes. For example, the embodiments could make use of any methods from the field of machine (or computer) vision including methods, techniques, or algorithms in machine vision and/or feature detection to identify and classify objects. Embodiments may use any known image processing methods such as stitching/registration, filtering, thresholding, pixel counting, segmentation, edge detection, color analysis, blob detection, pattern recognition or template matching, optical character recognition as well as other known methods. Some embodiments may use the scale-invariant feature transform (SIFT) algorithm that is used in object recognition, robotic mapping and image stitching. Embodiments may also use known techniques in deep learning to help process and classify objects within image data. These techniques include various kinds of deep neural networks. In some cases, embodiments may use one or more kinds of convolutional deep neural networks (CNNs) that are commonly used in image recognition and other areas of machine vision.

In some embodiments, various systems such as the remote deposit advocate system and/or a machine learning system could be implemented on a centralized computer system, such as computing system 1010. In some embodiments, the remote deposit advocate system and/or a machine learning system could be provided through a cloud service. In still other embodiments, the remote deposit advocate system and/or a machine learning system could be integrated into software running on a mobile device. Moreover, in some embodiments, some components or software modules of a system could run locally on a mobile device while other components or modules run on a centralized computer system. For example, the remote deposit advocate system could have modules running on a mobile device for storing model parameters and interfacing with sensors, and user interaction components (screen, controls, etc.). The remote deposit advocate system could also have modules running on a centralized computer system for more intensive processing tasks. Likewise, a machine learning system could be configured with some modules running directly on the mobile device and other modules running on a centralized computer system for more intensive processing tasks.

It may be appreciated that given sufficient processing power and memory, some or all components of the rental deposit advocate system and/or a machine learning system could be implemented on a remote device (such as a mobile device, smart phone, tablet computer, etc.). In such embodiments, tasks described above as being completed by a centralized computer system or server could be handled by software modules implemented on the remote device. As one example, though many machine learning algorithms require intensive processing for training, once the parameters of a machine learning model (such as a neural network) have been learned the deployed machine learning algorithm or system may be less computationally intensive to run and could be configured to run efficiently on a mobile computing device such as a smart phone or tablet computer.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units, Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for guiding a user of a mobile phone-along a path in a physical space using an application on the mobile phone, comprising the steps of:
   obtaining, by the application on the mobile phone, documentation of a previous inspection of the physical space, wherein the documentation of the previous inspection includes a plurality of inspected elements in the physical space;
   determining, by the application on the mobile phone, an initial condition of one or more inspected elements of the plurality of inspected elements in the physical space from the documentation of the previous inspection of the physical space;
   determining, by the application on the mobile phone, a path through the physical space that includes the one or more inspected elements;
   determining, by the application on the mobile phone, a current location of the user and locations of the one or more inspected elements in the physical space;
   guiding the user along the path through the physical space by displaying a map of the physical space on a display of the mobile phone through the application;
   displaying, by the application on the mobile phone, a guidance prompt on the map displayed on the display of the mobile phone from the current location of the user to each location of the locations of the one or more inspected elements along the path;
   obtaining, by the mobile device, a current condition of the one or more inspected elements in the physical space as the user follows the path through the physical space to the locations of the one or more inspected elements;
   determining, by the application on the mobile phone, changes between the initial condition and the current condition for each of the one or more inspected elements, wherein the changes are determined by a machine learning algorithm that classifies the changes as belonging to either a damaged class or an undamaged class;
   generating, by the application on the mobile phone, a report documenting the changes to the one or more inspected elements in the physical space;
   wherein obtaining the current condition of the one or more inspected elements includes passively obtaining documentation of the one or more inspected elements over a predetermined time period as the user follows the path through the physical space; and
   wherein passively obtaining the documentation of the one or more inspected elements comprises:
      monitoring at least one of an angle, position, or orientation of the mobile phone while the user is performing other tasks on the mobile phone;
      based on the at least one of the angle, position, or orientation of the mobile phone, determining whether a camera of the mobile phone is pointing at or facing towards an inspected element of the one or more inspected elements; and
      upon determining that the camera of the mobile phone is pointing at or facing towards the inspected element, automatically causing the camera of the mobile phone to take a picture of the inspected element without action by the user.

2. The method according to claim 1, wherein the path through the physical space is the same as a previous inspection path associated with the previous inspection.

3. The method according to claim 1, wherein the guidance prompt includes a verbal command to the user to move in a direction towards one or more inspected elements.

4. The method according to claim 1, further comprising:
   analyzing, by the application on the mobile phone, an image of the one or more inspected elements to determine whether the image documents the current condition of the one or more inspected elements; and
   upon determining that the image does not document the current condition of the one or more inspected elements, informing the user to capture one or more additional images.

5. The method according to claim 1, further comprising generating a request for a return of a security deposit for the physical space.

6. The method according to claim 1, further comprising:
automatically recognizing the inspected element when the camera of the mobile phone is pointing at or facing towards the inspected element.

7. The method according to claim 6, wherein the predetermined time period is based on an expiration of a lease or rental agreement associated with the physical space.

8. A method for guiding a user along a path in a physical space using a mobile phone using an application on the mobile phone, comprising the steps of:
obtaining, by the application on the mobile phone, documentation of a previous inspection of the physical space, wherein the documentation of the previous inspection includes a plurality of inspected elements in the physical space and a previous inspection path;
determining, by the application on the mobile phone, a current location of the user and locations of the plurality of inspected elements in the physical space;
guiding the user, via a map on a display of the mobile phone, along a path through the physical space that is substantially similar to the previous inspection path and that includes the plurality of inspected elements;
displaying, by the application on the mobile phone, a guidance prompt on the map displayed on the display of the mobile phone from the current location of the user to each location of the locations of the plurality of inspected elements along the path;
obtaining image information from a camera of the mobile phone at each location of the locations of the plurality of inspected elements along the path, the image information documenting a current condition of each inspected element of the plurality of inspected elements in the physical space;
comparing, by the application on the mobile phone, the image information documenting the current condition of each inspected element of the plurality of inspected elements to image information documenting an initial condition of each inspected element of the plurality of inspected elements included in the documentation of the previous inspection of the physical space;
determining, by the application on the mobile phone, changes between the initial condition and the current condition for each inspected element of the plurality of inspected elements, wherein the changes are determined by a machine learning algorithm that classifies the changes as belonging to either a damaged class or an undamaged class;
automatically generating, by the application on the mobile phone, a report documenting the changes in each inspected element of the plurality of inspected elements between the initial condition and the current condition determined by the machine learning algorithm;
sending to a landlord of the physical space the report and a request for a return of a security deposit for the physical space;
wherein obtaining image information documenting the current condition of each inspected element of the plurality of inspected elements includes passively obtaining the image information using the camera of the mobile phone while the user moves through the physical space over a predetermined time period; and
wherein passively obtaining the image information of each inspected element of the plurality of inspected elements comprises:
monitoring at least one of an angle, position, or orientation of the mobile phone while the user is performing other tasks on the mobile phone;
based on the at least one of the angle, position, or orientation of the mobile phone, determining whether the camera of the mobile phone is pointing at or facing towards an inspected element of the plurality of inspected elements; and
upon determining that the camera of the mobile phone is pointing at or facing towards the inspected element, automatically causing the camera of the mobile phone to take a picture of the inspected element without action by the user.

9. The method according to claim 8, wherein obtaining image information documenting the current condition of each inspected element of the plurality of inspected elements includes analyzing, by the application on the mobile phone, the image information for one or more inspected elements of the plurality of inspected elements to determine whether the image information documents the current condition of the one or more inspected elements; and
upon determining that the image information does not document the current condition of the one or more inspected elements, informing the user to obtain additional image information for the one or more inspected elements.

10. The method according to claim 9, wherein the initial condition of each inspected element of the plurality of inspected elements is obtained from image information captured along the previous inspection path included in the documentation of the previous inspection.

11. The method according to claim 8, further comprising: automatically recognizing the inspected element when the camera of the mobile phone is pointing at or facing towards the inspected element.

12. The method according to claim 8, wherein the guidance prompt includes a verbal command to the user to move in a direction towards one or more inspected elements of the plurality of inspected elements.

13. The method according to claim 11, wherein the predetermined time period is based on an expiration of a lease or rental agreement associated with the physical space.

14. The method according to claim 11, wherein passively obtaining the image information is performed in the background on the mobile phone while the user is holding the mobile phone in the physical space.

15. The method according to claim 8, further comprising:
monitoring a location of the user along the path through the physical space using the mobile phone;
upon determining that the location of the user along the path is associated with an inspection area including at least one inspection element of the plurality of inspected elements, issuing an alert to the user on the display of the mobile phone via the application on the mobile phone to document the at least one element at the inspection area at the location of the user.

16. A system for guiding a user along a path in a physical space, comprising:
at least one mobile phone, the at least one mobile phone including a display, a camera, and a machine learning algorithm configured to classify changes between an initial condition and a current condition as belonging to either a damaged class or an undamaged class;
at least one processor in communication with the at least one mobile phone through a communication network;
wherein the at least one processor is configured to:

obtain documentation of a previous inspection of the physical space, wherein the documentation of the previous inspection includes a plurality of inspected elements in the physical space and a previous inspection path;

determine a current location of the user and locations of the plurality of inspected elements in the physical space;

guide the user, via a map on the display of the mobile phone, along a path through the physical space that is substantially similar to the previous inspection path and that includes the plurality of inspected elements;

display, on the mobile phone, a guidance prompt on the map on the display from the current location of the user to each location of the locations of the plurality of inspected elements along the path;

obtain image information from the camera of the mobile phone at each location of the locations of the plurality of inspected elements along the path, the image information documenting a current condition of each inspected element of the plurality of inspected elements in the physical space;

compare the image information documenting the current condition of each inspected element of the plurality inspected elements to image information documenting an initial condition of each inspected element of the plurality of inspected elements included in the documentation of the previous inspection of the physical space;

determine changes between the initial condition and the current condition for each inspected element of the plurality of inspected elements using the machine learning algorithm to classify the changes as belonging to either the damaged class or the undamaged class;

automatically generate a report documenting the determined changes in each inspected element of the plurality of inspected elements between the initial condition and the current condition as belonging to either the damaged class or the undamaged class;

send to a landlord of the physical space the report and a request for a return of a security deposit for the physical space;

wherein the at least one processor is further configured to obtain the image information documenting the current condition each inspected element of the plurality of inspected elements by passively obtaining the image information using the mobile phone while the user moves through the physical space over a predetermined time period; and wherein passively obtaining the image information of each inspected element of the plurality of inspected elements comprises:

monitoring at least one of an angle, position, or orientation of the mobile phone while the user is performing other tasks on the mobile phone;

based on the at least one of the angle, position, or orientation of the mobile phone, determining whether the camera of the mobile phone is pointing at or facing towards an inspected element of the plurality of inspected elements; and upon determining that the camera of the mobile phone is pointing at or facing towards the inspected element, automatically causing the camera of the mobile phone to take a picture of the inspected element without action by the user.

17. The system according to claim 16, wherein the at least one processor is configured to:

monitor a location of the user along the path through the physical space using the mobile phone;

upon determining that the location of the user along the path is associated with an inspection area including at least one inspection element of the plurality of inspected elements, issue an alert to the user on the display of the mobile phone to document the at least one element at the inspection area at the location of the user.

18. The system according to claim 16, wherein the at least one processor is configured to:

analyze the image information for one or more inspected elements of the plurality of inspected elements to determine whether the image information documents the current condition of the one or more inspected elements; and upon determining that the image information does not document the current condition of the one or more inspected elements, inform the user to obtain additional image information for the one or more inspected elements.

19. The system according to claim 16, wherein the at least one processor is further configured to automatically recognize the inspected element when the camera of the mobile phone is pointing at or facing towards the inspected element.

20. The system according to claim 16, wherein the guidance prompt includes a verbal command to the user to move in a direction towards one or more inspected elements of the plurality of inspected elements.

* * * * *